US012237904B2

United States Patent
Jaldén et al.

(10) Patent No.: US 12,237,904 B2
(45) Date of Patent: Feb. 25, 2025

(54) REALLOCATING RESOURCES IN A WIRELESS COMMUNICATIONS NETWORK

(71) Applicant: Telefonaktiebolaget LM Ericsson (publ), Stockholm (SE)

(72) Inventors: Niklas Jaldén, Enköping (SE); Pål Frenger, Linköping (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/268,747

(22) PCT Filed: Dec. 22, 2020

(86) PCT No.: PCT/SE2020/051248
§ 371 (c)(1),
(2) Date: Jun. 21, 2023

(87) PCT Pub. No.: WO2022/139635
PCT Pub. Date: Jun. 30, 2022

(65) Prior Publication Data
US 2024/0039609 A1 Feb. 1, 2024

(51) Int. Cl.
*H04W 72/0453* (2023.01)
*H04B 7/06* (2006.01)
(Continued)

(52) U.S. Cl.
CPC ....... *H04B 7/06952* (2023.05); *H04L 5/0048* (2013.01); *H04W 72/0453* (2013.01); *H04W 72/51* (2023.01)

(58) Field of Classification Search
CPC .......... H04B 7/06952; H04W 72/0453; H04W 72/51
See application file for complete search history.

(56) References Cited

U.S. PATENT DOCUMENTS

2008/0117871 A1   5/2008   Olexa et al.
2020/0059929 A1   2/2020   Jones
(Continued)

FOREIGN PATENT DOCUMENTS

EP   1 853 077 A1   11/2007
EP   2 397 011 B1    5/2019
EP   3 697 135 A1    8/2020

OTHER PUBLICATIONS

International Search Report and Written Opinion issued in International Application No. PCT/SE2020/051248 Sep. 10, 2021 (11 pages).

*Primary Examiner* — Rahel Guarino
(74) *Attorney, Agent, or Firm* — Rothwell, Figg, Ernst & Manbeck, P.C.

(57) ABSTRACT

The present disclosure relates to a method of a radio base station (20) of controlling allocation of resources to wireless communication devices (23, 24), and a radio base station (20) performing the method. In an aspect, a method of a radio base station (20) of controlling allocation of resources to wireless communication devices (23, 24) is provided. The method comprises providing (S101) a first location with radio coverage using at least a first frequency band and a second frequency band and a second location with radio coverage using the first frequency band, the second frequency band being located at a higher frequency than the first frequency band and temporarily reallocating (S102) resources of the second frequency band from the first location to the second location upon acquiring an indication that a wireless communication device (24) at the second location requires improved coverage.

19 Claims, 4 Drawing Sheets

(51) Int. Cl.
    *H04L 5/00*         (2006.01)
    *H04W 72/51*     (2023.01)

(56) References Cited

U.S. PATENT DOCUMENTS

2020/0084797 A1*   3/2020   Marjelund ............ H04L 5/0055
2020/0329523 A1    10/2020   Yi et al.
2020/0343942 A1    10/2020   Ronkainen et al.

* cited by examiner

REALLOCATING RESOURCES IN A WIRELESS COMMUNICATIONS NETWORK

CROSS REFERENCE TO RELATED APPLICATIONS

This application is a 35 U.S.C. § 371 National Stage of International Patent Application No. PCT/SE2020/051248, filed 2020 Dec. 22.

TECHNICAL FIELD

The present disclosure relates to a method of a radio base station of controlling allocation of resources to wireless communication devices, and a radio base station performing the method.

BACKGROUND $5^{th}$ generation (5G) New Radio (NR) wireless communications systems are currently being deployed worldwide using advanced antenna systems (AAS) to support multiple input multiple output (MIMO) approaches via spatial multiplexing of data through beamforming technology.

As with most legacy communication systems, deployments are initially focused on dense urban environments where an increase in capacity is needed to cope with the increasing demand in bandwidth for new use-cases and applications. However, a challenge is that over time, network operators typically also require supporting more rural areas requiring the support of greater radio coverage.

SUMMARY

One objective is to solve, or at least mitigate, this problem in the art related to radio coverage and to provide an improved method of controlling allocation of resources to wireless communication devices.

This objective is attained in a first aspect by a method of a radio base station of controlling allocation of resources to wireless communication devices. The method comprises providing a first location with radio coverage using at least a first frequency band and a second frequency band and a second location with radio coverage using the first frequency band, the second frequency band being located at a higher frequency than the first frequency band and temporarily reallocating resources of the second frequency band from the first location to the second location upon acquiring an indication that a wireless communication device at the second location requires improved coverage.

This objective is attained in a second aspect by a radio base station configured to control allocation of resources to wireless communication devices. The radio base station comprises a processing unit and a memory, said memory containing instructions executable by said processing unit, whereby radio base station is operative to provide a first location with radio coverage using at least a first frequency band and a second frequency band and a second location with radio coverage using the first frequency band, the second frequency band being located at a higher frequency than the first frequency band and to temporarily reallocate resources of the second frequency band from the first location to the second location upon acquiring an indication that a wireless communication device at the second location requires improved coverage.

Thus, resources of a high-frequency band provided by the radio base station (RBS) is advantageously reallocated from a first location to a second location, i.e. from a first wireless communication device to a second wireless communication device, upon the RBS acquiring an indication that the second wireless communication device requires improved coverage.

Thus, the RBS provides the first location with radio coverage using both a low-frequency band and the high frequency band, and the second location with radio coverage using the low-frequency band only.

However, rather than using the high-frequency band to provide full coverage in the first location, resources of the high-frequency band are temporarily reallocated from the first location where the first wireless communication device resides to the second location where the second wireless communication device resides, upon acquiring an indication that the second wireless communication device requires improved coverage. In other words, resources of the high-frequency band are reallocated to the second wireless communication device at the expense of the first wireless communication device. As is understood, the first wireless communication device is still able to communicate over the low-frequency band.

As a result, the second wireless communication device e.g. performing a mission-critical task is able to establish a communication link with the RBS via the high-frequency band using the temporarily reallocated resources to perform the task (even though the second wireless communication device still may be capable of establishing a connection via the low-frequency band, but which does not have sufficient capacity to accomplish the intended task). A temporary reallocation of resources in for instance mission-critical services advantageously allows for more cost efficient nationwide cellular systems.

As is understood, it is envisaged that further frequency bands may be employed, such as e.g. a third mid-frequency band serving both the first location and the second location, even though embodiments herein are illustrated to employ two frequency bands in the form of the low-frequency band and the high-frequency band.

In an embodiment, the reallocation of resources of the second frequency band comprises performing one or more of beamforming, antenna direction or beam sweeping in a direction towards the second location.

In an embodiment, the performing of beam sweeping comprising reserving at least one synchronization signal block (SSB) beam for temporarily reallocating resources of the second frequency band from the first location to the second location.

In an embodiment, the providing of the second location with radio coverage comprising establishing an initial connection with the wireless communication device at the second location to enable the wireless communication device to act as an access point for further wireless communication devices using the temporarily reallocated resources of the second frequency band.

In an embodiment, a separate cell identifier is allocated to the second location.

In an embodiment, the acquiring of an indication that the wireless communication device at the second location requires improved coverage comprises acquiring location information of said wireless communication device at the second location and determining form the acquired location information whether or not improved coverage should be provided.

In an embodiment, the acquiring of an indication that the wireless communication device at the second location requires improved coverage comprises receiving a signal from said wireless communication device at the second location indicating that improved coverage should be provided.

In an embodiment, the acquiring of an indication that the wireless communication device at the second location requires improved coverage comprises receiving the indication from a network management function.

In an embodiment, only wireless communication devices associated with mission-critical services are allowed to obtain the temporarily reallocated resources.

In a third aspect, a computer program is provided comprising computer-executable instructions for causing a radio base station to perform the method according to the first aspect when the computer-executable instructions are executed on a processing unit included in the radio base station.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
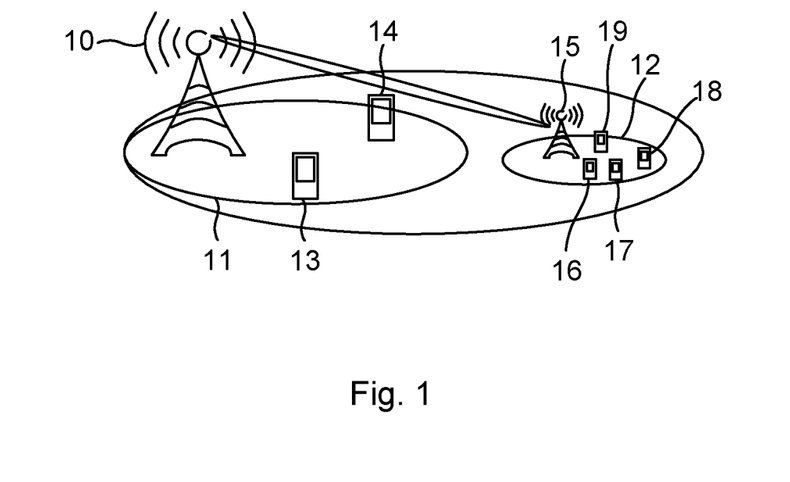
FIG. 1 illustrates a radio base station serving first area using both a first frequency band and a second frequency band while serving second area using the first frequency band only.

FIG. 1 illustrates a radio base station (RBS) 10 serving first area 11 using both a first frequency band (e.g. around 700 MHz) and a second frequency band (e.g. around 3.5 GHz) while serving second area 12 using the first frequency band only, where the second band is at a higher frequency than the first band. In the following, the first band will be referred to as the low-frequency band while the second band will be referred to as the high-frequency band. Further, it is understood that further frequency bands may be employed, such as e.g. a third mid-frequency band.

Hence, the first area 11 including wireless communication devices 13, 14, in the following referred to as user equipment (UE), is assigned a higher capacity in that it is served by both the low-frequency band and the high-frequency as compared to the second area 12 which is served by the low-frequency band only. In this example, the second area 12 comprises a hotspot 15 which in its turn provides coverage to UEs 16-19. That is, the hotspot 15 may be embodied by a somewhat more capable UE possibly having an erectable antenna, which connects to the RBS 10 and sets up a new local cell 12 for relaying traffic.

With NR having support for machine type communication (MTC) use cases, both massive MTC (mMTC) and critical MTC (cMTC), ultra-reliable low-latency communication (URLLC), large coverage is a requirement for several use cases such as automotive, transport, railways, national security and public safety (NSPS), etc. For such use cases area-coverage is more important than population coverage, which typically has been a key performance indicator (KPI) for mobile broadband services provided by a cellular network.

Studies on the capability of NR beamforming in low-frequency bands and especially mid-frequency bands show that NR is capable of providing large coverage due to the additional directivity gain of the AAS systems. By combining low-frequency band Long Term Evolution (LTE) anchors with mid-frequency band NR carriers with non-standalone dual connectivity or both NR carriers, one in low-frequency band and one in mid/high-frequency band, using carrier aggregation in stand-alone NR, large coverage as well as high system capacity can be achieved. The low-frequency band provide long range with limited bandwidth mid/high-frequency band provides limited reach but large bandwidth.

Again, with reference to FIG. 1, the RBS 10 provides the first area 11 and thus UEs 13, 14 with coverage using both the low-frequency band and the high-frequency band, thereby enabling large bandwidth in the first area 11 via the high frequency band.

Further, in order to provide a large coverage range, the RBS 10 provides the second area 12 with coverage using only the low-frequency band. As shown in FIG. 1, the hotspot 15 is typically a slightly more capable UE as compared to the remaining UEs 16-19 in the second area 12, such as a UE equipped with a more powerful antenna system in the form of e.g. one or more directive antennas and/or being capable of transmitting with a higher power level, and occasionally also being elevated to a higher altitude to attain better signal reception.

Commonly, the larger area covering both the first area 11 and the second area 12 served by the RBS 10 is referred to as an umbrella cell, while the smaller area served by the hotspot 15 is referred to as a microcell. It is noted that the RBS 10 may provide coverage to a number of hotspots using the low-frequency band, where each hotspot forms its own microcell. The umbrella cell concept enables very large cells providing cost efficient nationwide coverage and capacity for rural and mission-critical scenarios.

For instance, the hotspot 15 may be utilized to relay traffic locally to a mission-critical service such as a fire brigade, police, military, etc. In such a setup, high capacity on a single, semi-stationary hotspot communication link is expected. A hotspot mounted on a van, boat or other vehicle with a raiseable antenna would allow easy deployment during a mission anywhere in a country and have reliable high-capacity connection.

Figure 2:
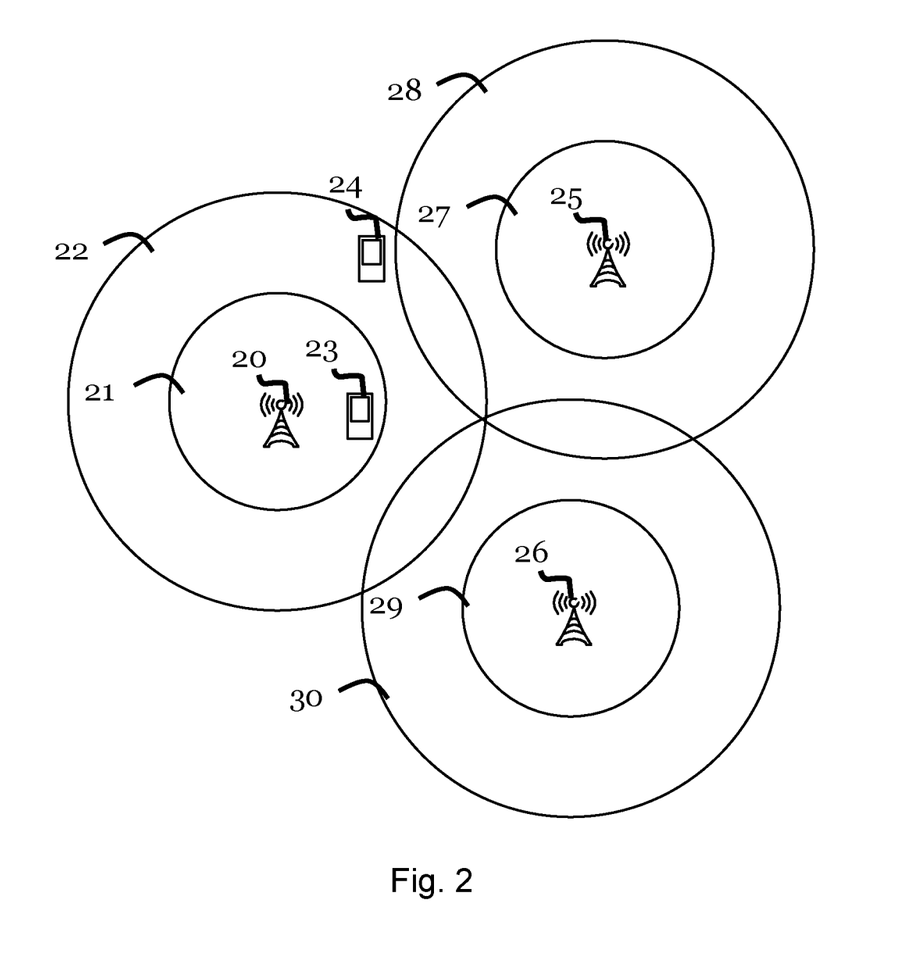
FIG. 2 illustrates a scenario where embodiments may be implemented.

FIG. 2 illustrates a scenario where embodiments may be implemented. An RBS 20 provides first area 21 with radio coverage using both a low-frequency band and a high-frequency band while providing second area 22 with coverage using the low-frequency band only. Thus, a higher bandwidth is provided in the first area 21 by means of the high-frequency band while the low-frequency provides coverage in both the first area 21 and the second area 22.

Further shown in FIG. 2 are neighbouring RBSs 25, 26 both providing coverage in two areas 27, 28 and 29, 30, respectively, similar to the RBS 20.

In FIG. 2, a first UE 23 is located in the first area 21 while a second UE 24 is located in the second area 22. That is, high- and low-band coverage is provided to the first UE 23, while only low-band coverage (and hence lower capacity and bitrate) is provided to the second UE 24.

Now, assuming that a mission-critical event occurs in the second area 22, e.g. that the second UE 24 is associated with a fire squad; it may happen that the current capacity available at the location of the second UE 24 is insufficient and that the second UE 24 cannot establish a connection with the RBS 20 (with potentially devastating consequences).

Figure 3:
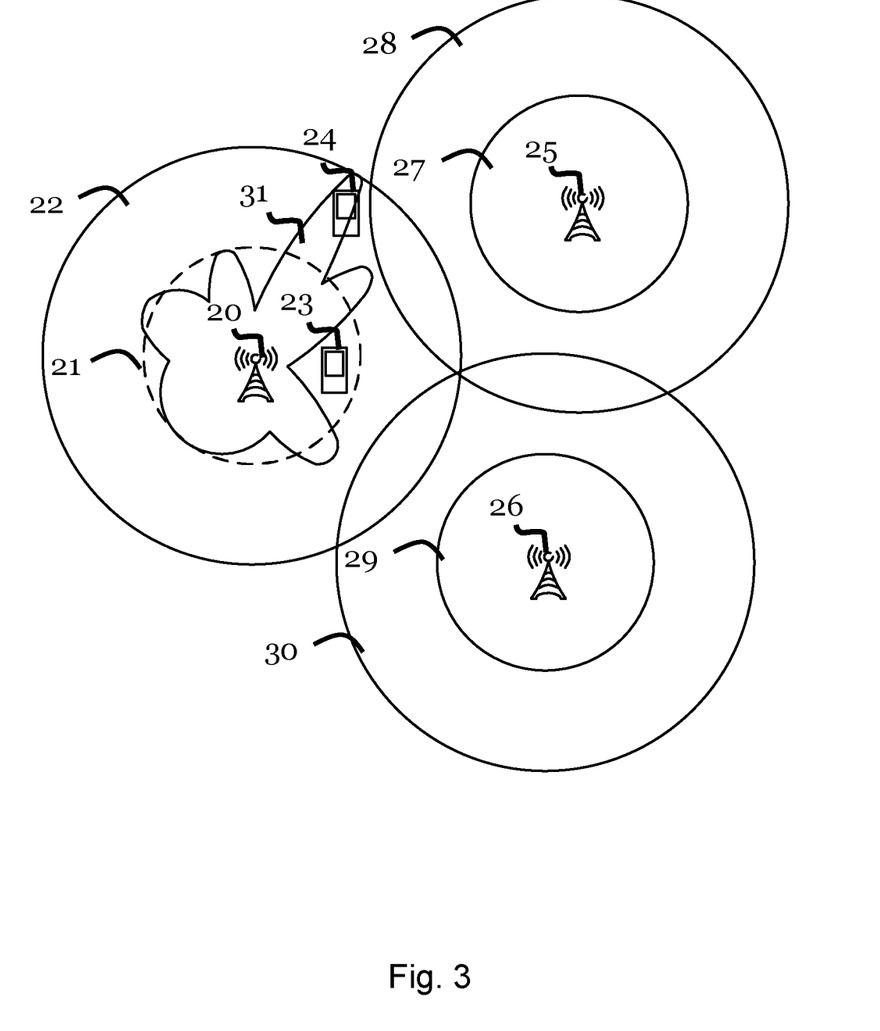
FIG. 3 illustrates an embodiment of the radio base station of FIG. 2 reallocating resources.
Figure 4:
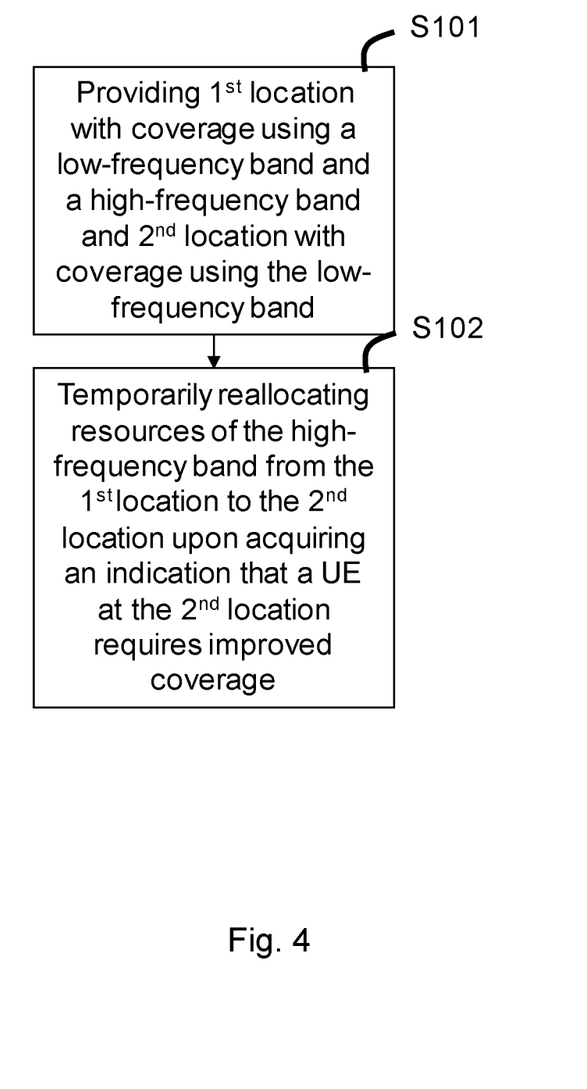
FIG. 4 shows a flowchart illustrating a method of the radio base station of controlling allocation of resources to wireless communication devices according to an embodiment.

FIG. 3 illustrates an embodiment of the RBS reallocating resources where the problem of FIG. 2 is resolved. Reference is further made to FIG. 4 showing a flowchart illustrating a method of the RBS 20 of controlling allocation of resources to the UEs 23, 24 according to this embodiment.

In this embodiment, resources of the high-frequency band provided by the RBS 20 is advantageously reallocated from the first area 21 to the second area 22, i.e. from the first UE 23 to the second UE 24, as illustrated by means of modified coverage area 31, upon the RBS 20 acquiring an indication that the second UE 24 requires improved coverage.

Thus, the RBS 20 provides in step S101 a first location illustrated by the first area 21 with radio coverage using both the low-frequency band and the high frequency band, and a second location illustrated by the second area 22 with radio coverage using the low-frequency band only.

However, rather than using the high-frequency band to provide full coverage in the first area 21, resources of the high-frequency band are temporarily reallocated in step S102 from the first location where the first UE 23 resides to the second location where the second UE 24 resides, upon acquiring an indication that the second UE 24 requires improved coverage. In other words, resources of the high-frequency band are reallocated to the second UE 24 at the expense of the first UE 23. As is understood, the first UE 23 is still able to communicate over the low-frequency band.

As a result, the second UE 24 performing a mission-critical task is able to establish a communication link with the RBS 20 via the high-frequency band using the temporarily reallocated resources to perform the task (even though the second UE 24 still may be capable of establishing a connection via the low-frequency band, but which does not have sufficient capacity to accomplish the intended task). A temporary reallocation of resources in for instance mission-critical services advantageously allows for more cost efficient nationwide cellular systems.

As previously mentioned, it is envisaged that further frequency bands may be employed, such as e.g. a third mid-frequency band, even though embodiments herein are illustrated to employ two frequency bands in the form of the low-frequency band and the high-frequency band.

Figure 5:
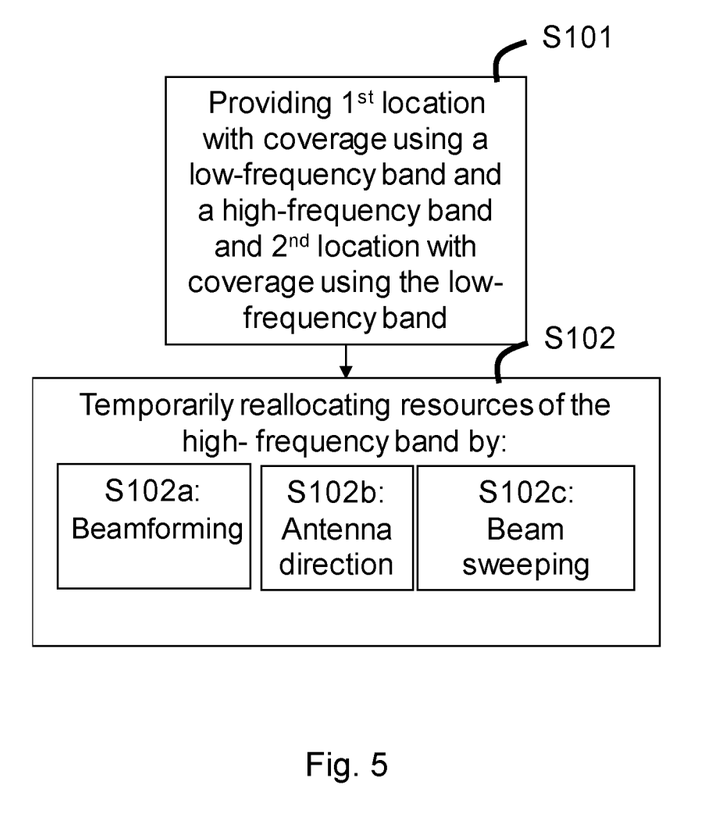
FIG. 5 shows a flowchart illustrating a method of the radio base station of controlling allocation of resources to wireless communication devices according to embodiments.

With reference to FIG. 5, in embodiments the reallocation of resources of the second frequency band comprises providing one or more of beamforming (step S102*a*), antenna direction (step S102*b*) or beam sweeping (step S102*c*) in a direction towards the second location, as will be discussed in more detail in the following.

In an embodiment, the reallocation of resources of the high-frequency band from the first UE 23 to the second UE 24 is performed using beamforming as illustrated in step S102*a* and/or antenna direction as illustrated in step S102*b* in order to enable the second UE 24 to experience a stronger beam via the high-frequency band provided by the RBS 20 and thus receive a stronger signal. For instance, the RBS 20 directs one or more of its antennas from the first UE 23 towards the second UE 24 or uses the antennas to performing beamforming towards the second UE 24.

In another embodiment, the reallocation of resources of the high-frequency band from the first UE 23 to the second UE 24 is performed using beam sweeping as illustrated in step S102*c*, where the RBS 20 directs beams in predefined directions at given intervals and sends one or more bursts of data in each direction. By directing a beam towards the second UE 24, the capacity is temporarily increased.

In 5G, the beams are referred to as synchronization signal block (SSB) beams, where for instance the high-frequency band at 3.5 GHz may be spread over 8 SSB beams each covering 15°, thus totally covering 120°, while the low-frequency band at 700 MHz may be spread over 4 SSB beams.

In an embodiment, in step S102*c* where the RBS 20 performs beam sweeping to reallocate resources of the high-frequency band from the first UE 23 to the second UE 24, one or more SSB beams are reserved for dynamically generating coverage for the second UE 24 at its location. In an example, the high-frequency band may be spread over 6 or 7 beams that are slightly wider (i.e. 120/6=20° or 120/7=17°, respectively), while one or two beams are utilized to improve the coverage for the second UE 24. It may further be envisaged that only mission-critical UEs will be given access to these reserved beams.

In an embodiment the low-frequency band is used to establish an initial connection with the second UE 24 acting as an access point (cf. the hotspot 15 of FIG. 1) for further UEs within the reach of the second UE 24. By having the RBS 20 positioning the second UE 24 for instance by estimating azimuth and elevation, a very narrow beam with a high bandwidth can be created between the RBS 20 and the second UE 24 using the high-frequency band via a reserved SSB beam.

In another embodiment, a separate cell ID is used for the second location or the second UE 24 acting as an access point. As previously, an initial connection is established on the low-frequency band which allows for estimation of suitable beamforming parameters as well as required signalling for requesting and configuring a narrow beam using the high-frequency band. In this embodiment, the high-frequency band would be equipped with two cell IDs, one for public use with 8 SSB beams, and another for mission-critical use with a designated SSB for the second UE 24. The mission-critical SSB may e.g. have a different public land mobile network (PLMN) ID that only mission-critical UEs are not allowed to use.

In an embodiment, the RBS 20 acquires the indication that the second UE 24 requires improved coverage in the second area 22 by acquiring location information of the second UE 24, such as e.g. coordinates of the second UE 24 utilizing for instance Global Positioning System (GPS) or heading or bearing of the second UE 24, and concluding that the second UE 24 is at a location where improved coverage should be provided. For instance, the RBS 20 may determine that if the second UE 24 is located on a certain distance from the RBS 15, say 15 km, it is likely that the coverage needs to be improved.

It may further be envisaged that the second UE 24 sends a signal to the RBS 20 indicating that improved coverage is required. It should be noted that even if the coverage is insufficient to establish a fully functioning communication link of adequate quality, the coverage may still be sufficient to send a signal indicating that improved coverage is needed at the location of the second UE 24. Further, it is envisaged that that the signal indicating that improved coverage is required may be sent from the second UE 24 to the RBS 20 over the low-frequency band.

In another embodiment, the indication that improved coverage is required for the second UE 24 is received from a network management function, which for instance may pre-schedule temporary resource reallocation for a mission-critical task. For example, a rescue service vehicle in the form of e.g. an ambulance may contact the network management function and indicate that a rescue service vehicle fleet is heading towards a location where additional resources must be (at least temporarily) allocated. Advantageously, with a planned operation, resource allocation can be taken into account in advance.

Figure 6:
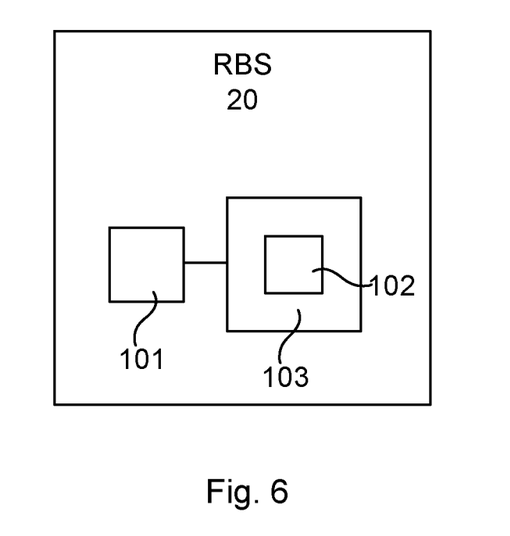
FIG. 6 illustrates a radio base station according to an embodiment.

FIG. 6 illustrates an RBS 20 configured to control allocation of resources to wireless communication devices according to an embodiment. The steps of the method performed by the RBS 20 are in practice performed by a processing unit 101 embodied in the form of one or more microprocessors arranged to execute a computer program 102 downloaded to a suitable storage volatile medium 103 associated with the microprocessor, such as a Random Access Memory (RAM), or a non-volatile storage medium such as a Flash memory or a hard disk drive. The processing unit 101 is arranged to cause the RBS 20 to carry out the method according to embodiments described herein, when the appropriate computer program 102 comprising computer-executable instructions is downloaded to the storage medium 103 and executed by the processing unit 101. The storage medium 103 may also be a computer program product comprising the computer program 102. Alternatively, the computer program 102 may be transferred to the storage medium 103 by means of a suitable computer program product, such as a Digital Versatile Disc (DVD) or a memory stick. As a further alternative, the computer program 102 may be downloaded to the storage medium 103 over a network. The processing unit 101 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of controlling allocation of resources to wireless communication devices, comprising:
providing a first location with radio coverage using at least a first frequency band and a second frequency band, the second frequency band being located at a higher frequency than the first frequency band;
providing a second location with radio coverage using the first frequency band; and
temporarily reallocating resources of the second frequency band from the first location to the second location upon acquiring an indication that a wireless communication device at the second location requires improved coverage.

2. The method of claim 1, wherein temporarily reallocating resources of the second frequency band from the first location to the second location comprises performing one or more of beamforming, antenna direction or beam sweeping in a direction towards the second location.

3. The method of claim 2, wherein
the reallocation of resources of the second frequency band comprises beam sweeping in the direction towards the second location, and
the beam sweeping comprises reserving at least one synchronization signal block (SSB) beam for temporarily reallocating resources of the second frequency band from the first location to the second location.

4. The method of claim 1, wherein providing the second location with radio coverage comprises establishing an initial connection with the wireless communication device at the second location to enable the wireless communication device to act as an access point for further wireless communication devices using the temporarily reallocated resources of the second frequency band.

5. The method of claim 1, further comprising allocating a separate cell identifier to the second location.

6. The method of claim 1, wherein acquiring the indication that the wireless communication device at the second location requires improved coverage comprises acquiring location information of said wireless communication device and determining from the acquired location information whether or not improved coverage should be provided.

7. The method of claim 1, wherein acquiring the indication that the wireless communication device at the second location requires improved coverage comprises receiving from said wireless communication device a signal indicating that improved coverage should be provided.

8. The method of claim 1, wherein acquiring the indication that the wireless communication device at the second location requires improved coverage comprises receiving the indication from a network management function.

9. The method of claim 1, wherein only wireless communication devices associated with mission-critical services are allowed to obtain the temporarily reallocated resources.

10. A non-transitory computer readable storage medium storing a computer program comprising computer-executable instructions for causing a radio base station to perform the method of claim 1 when the computer-executable instructions are executed on a processing unit included in the radio base station.

11. A radio base station configured to control allocation of resources to wireless communication devices, the radio base station comprising:

a processing unit; and memory containing instructions executable by said processing unit, wherein radio base station is operative to:

provide a first location with radio coverage using at least a first frequency band and a second frequency band, the second frequency band being located at a higher frequency than the first frequency band;

provide a second location with radio coverage using the first frequency band; and temporarily reallocate resources of the second frequency band from the first location to the second location upon acquiring an indication that a wireless communication device at the second location requires improved coverage.

12. The radio base station of claim 11, being operative to, when temporarily reallocating resources of the second frequency band, performing one or more of beamforming, antenna direction or beam sweeping in a direction towards the second location.

13. The radio base station of claim 12, being operative to, when performing beam sweeping, reserving at least one synchronization signal block (SSB) beam for temporarily reallocating resources of the second frequency band from the first location to the second location.

14. The radio base station of claim 11, being operative to, when providing the second location with radio coverage, establishing an initial connection with the wireless communication device at the second location to enable the wireless communication device to act as an access point for further wireless communication devices using the temporarily reallocated resources of the second frequency band.

15. The radio base station of claim 11, being operative to allocate a separate cell identifier to the second location.

16. The radio base station of claim 11, being operative to, when acquiring the indication that the wireless communication device at the second location requires improved coverage, acquiring location information of said wireless communication device at the second location and determining from the acquired location information whether or not improved coverage should be provided.

17. The radio base station of claim 11, being operative to, when acquiring the indication that the wireless communication device at the second location requires improved coverage, receiving a signal from said wireless communication device at the second location indicating that improved coverage should be provided.

18. The radio base station of claim 11, being operative to, when acquiring the indication that the wireless communication device at the second location requires improved coverage, receiving the indication from a network management function.

19. The radio base station of claim 11, wherein only wireless communication devices associated with mission-critical services are allowed to obtain the temporarily reallocated resources.

* * * * *